United States Patent
Small et al.

[11] Patent Number: 6,078,649
[45] Date of Patent: Jun. 20, 2000

[54] REMOTE SUBSCRIBER LOOP TERMINAL ALARM MONITORING

[75] Inventors: James M. Small, Hampton; Dennis White, Newport News, both of Va.

[73] Assignee: Bell Atlantic Network Services, Inc., Arlington, Va.

[21] Appl. No.: 09/222,789

[22] Filed: Dec. 30, 1998

[51] Int. Cl.$^7$ ................................................ H04M 11/04
[52] U.S. Cl. .................................. 379/39; 379/42; 379/47
[58] Field of Search .................................. 379/39, 37, 42, 379/40, 43, 44, 47, 48

[56] References Cited

U.S. PATENT DOCUMENTS

| | | | |
|---|---|---|---|
| 4,447,872 | 5/1984 | Nothaft | 379/40 |
| 5,884,184 | 3/1999 | Sheffer | 379/39 |

*Primary Examiner*—Curtis A. Kuntz
*Assistant Examiner*—Melur Ramakrishnaiah
*Attorney, Agent, or Firm*—McDermott, Will & Emery

[57] ABSTRACT

A centralized network total system maintenance facility is provided for processing alarm data received from a plurality of remote monitoring stations at remote terminals in a telephone network. The vast amount of incoming data are collected and logged into a file. The data is processed to provide information as to what alarm on status conditions are current. Under control of a processor at the facility, data collected in the file are read at predetermined intervals and filtered for the current time interval since the last reading. The filtered data are processed to determine whether alarm on status conditions in effect have changed to off status and whether new alarm on status conditions have occurred. All current alarm on status conditions can be displayed with identification of the location, type of alarm condition for a particular sensed parameter, and other information, such as the time the alarm was generated and the priority of the condition. A plurality of user work station terminals having individual access to the data base log are provided at the facility for display of data in accordance with varied criteria selected by the work station attendants.

7 Claims, 5 Drawing Sheets

REMOTE SUBSCRIBER LOOP TERMINAL ALARM MONITORING

TECHNICAL FIELD

The present invention relates to monitoring alarm conditions at remote subscriber loop terminals, more particularly to the transfer of alarm data from one or more of such terminals to a centralized location at which all alarm data may be processed and displayed.

BACKGROUND OF THE INVENTION

Public switched telephone networks have served subscribers by transporting telephone signals between a central office and customer premises equipment using a subscriber loop, also referred to as the local loop. The local loop is composed of wires, poles, terminals, conduits, and other outside plant equipment that connect customer premises equipment to the central office of the local exchange carrier. The distance that a copper subscriber loop can be extended from a given central office, known as the carrier serving area, has generally been limited to a range between 9,000 and 12,000 feet. Thus, subscribers within 9,000 feet of the central office can be connected thereto directly via copper POTS lines.

Digital loop carrier systems have been developed to extend the traditional narrowband services such as POTS and ISDN beyond 9,000 feet for a given central office. In digital loop carrier systems, such as subscriber loop carrier (SLC) systems, bidirectional communication usually occurs between a central office (e.g., a local digital switch) and a remote terminal located somewhere between the central office and the vicinity of a customer's premises. Information is transferred between the central office and the remote terminal according to Bellcore TR-008 and TR-303 interface standards using optical fibers carrying 64 kb/s encoded digital channels multiplexed on an optical transport, for example an OC-3 SONET transport. The remote terminal includes optical to electrical interfaces for converting the OC-3 signal from the incoming optical fiber into an electrical signal, and a time slot interchange (TSI) for demultiplexing the 64 kb/s digital channel to telephone line cards. Each telephone line card is configured to serve up to four separate subscriber loops, according to either POTS or ISDN protocol, by respective copper pairs supplying two-way telephone signals to respective subscriber premises equipment.

Digital loop carrier infrastructure can be used to provide various enhanced services, for example, communication of broadband data for multimedia or video services. A portion of the OC-3 transport capacity of the optical fiber between the central office and the remote terminal can be reserved for broadband data, with optical fiber interconnection between the remote terminal and an adjacent remote terminal. Alternatively, a fiber may be run from the central office to the second remote terminal direct from the central office. The second terminal may contain asymmetrical digital subscriber line (ADSL) modem cards. The broadband data can be passed via the second optical fiber, e.g., from the first remote terminal (having telephone line cards), to the second remote terminal (having ADSL modem cards) to modulate the broadband data onto the subscriber loops using the corresponding ADSL modems.

Figure 1:
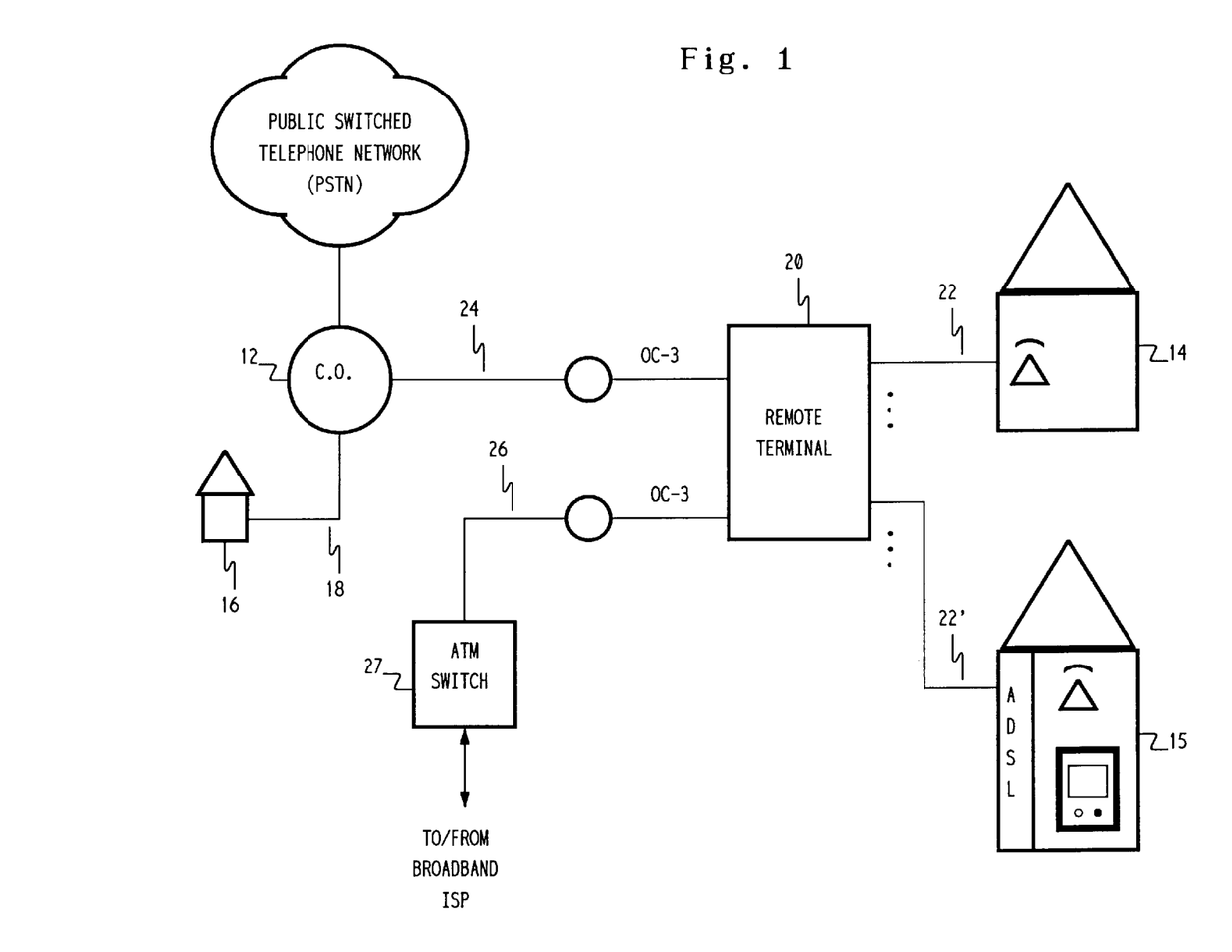
FIG. 1 is a simplified block diagram of a network in which a remote terminal is used as a multichannel information distribution system for supplying communication between a central office and subscribers in a digital loop carrier serving area.

Copending application, Serial Number 09/138,406, filed Aug. 24, 1998 which is incorporated by reference herein, discloses a digital loop carrier remote terminal in detail. FIG. 1 is a simplified block diagram indicative of a network in which such a remote terminal may find use as a multi-channel information distribution system for supplying communication between a central office and subscribers in a digital loop carrier serving area. The distribution system provides communication services between a central office (CO) 12 and subscriber premises equipment 14 and 15 without the necessity of a direct connection therebetween. Central office 12 may also serve nearby subscriber premises equipment 16 by direct connection of twisted wire pair lines 18 to a subscriber loop interface, or subscriber line card, within the central office. Remote terminal 20 is connected to central office 12 by a set of optical fibers 24 that carry digitally multiplexed voice channels transported, for example, using a SONET bidirectional OC-3 rate. Subscriber premises equipment 14 and 15 are connected to the remote terminal by twisted pair lines 22 and 22', respectively.

The remote terminal 20 includes multiplexing capabilities for establishing a two-way telephone connection for each subscriber premises telephone equipment by selectively outputting the narrowband data received by the remote terminal 20 to and from the optical fibers 24 and the appropriate twisted wire copper pair connection forming the subscriber loop 22 or 22'. The remote terminal 20 also includes subscriber line circuits for logically connecting the subscriber loop 22 or 22' to a selected one of the narrowband data channels transported by the optical fibers 24.

The system has the capability of serving subscribers with enhanced telephony and broadband services, for example video on demand, or high-speed access to data networks such as the Internet, as well as standard telephone POTS services. Subscriber premises 14 is illustrative of standard POTS service provisioning. Subscriber premises 15 exemplifies use of a conventional telephone as well as a data terminal, such as a personal computer (PC) having an Internet web browser, or a digital entertainment terminal (DET). The DET can communicate with a video dial tone network configured for generating upstream control signals to a broadband information service provider (ISP), and for decoding broadband data received via the corresponding subscriber loop 22' from the broadband ISP. This network communication path includes ATM switch 27 and fiber optic line 26 to the remote terminal. Reference is made to the above-identified application for a detailed description of the remote terminal and operation in a system such as shown in FIG. 1.

A variety of remote terminals are in use in the public switched telephone network, many of which are more simplified than the above described example. Remote terminals generally are enclosed structures, located on site, within which equipment resides for performing any of a wide array of communications. Such equipment may typically comprise a remote line unit, remote line switch, remote line concentrator, and the like. Monitoring of remote terminals or hubs is necessary so that faults can be determined and corrected. Avoidance of the need for frequent on site attendant testing is achieved through remote monitoring. For this purpose, remote terminals are generally provided with analog sensors that generate alarm signals indicative of any of various failures, such as power failure, a physical breach of the terminal enclosure (such as an open door), etc. Alarm signals are also generated for excessive environmental conditions, such as heat, temperature and battery power.

Transmission of alarm signals from a plurality of remote terminals to a maintenance station at a centralized location permits simultaneous surveillance of the remote terminals without the need for an attendant's presence at each remote location. Commercially available monitoring units, such as Hercules, CHATLOS, Spartan, and the like, placed on site, enable dial up to the centralized location in response to a generated change of state alarm signal at the remote terminal. Analog sensors change the state of contacts in a dc loop that is connected to a respective port in the monitoring unit. For each condition sensed, each remote monitoring station transmits a data message, typically in ASCII format, to the centralized maintenance station, which is printed on one line of a printer. The message includes, among other information, the address of the sending station and the alarm status condition.

Figure 2:
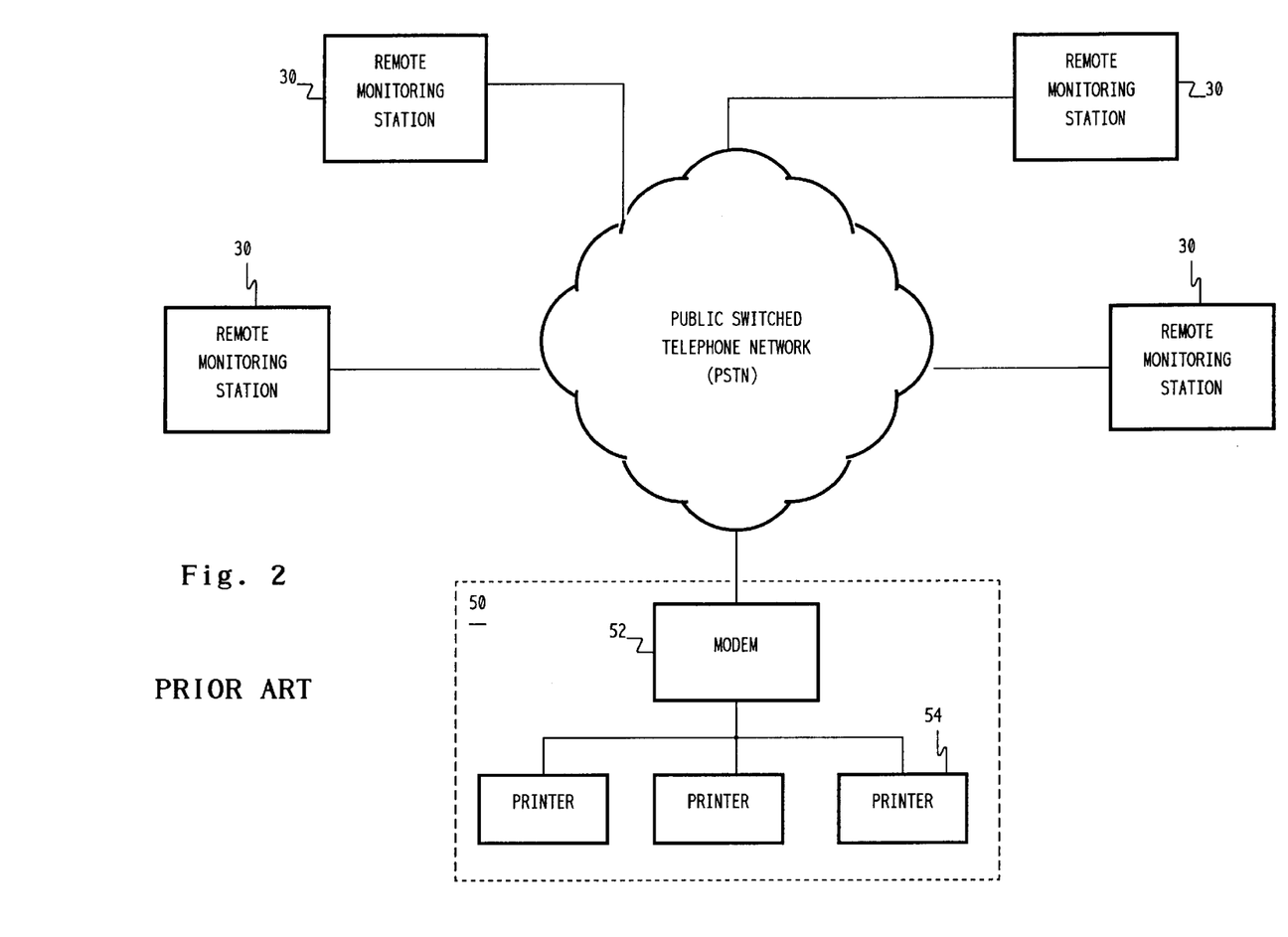
FIG. 2 is a simplified block diagram of a network remote terminal monitoring system in accordance with the prior art.

FIG. 2 is a simplified block diagram of a prior art network remote terminal monitoring system, as described above. A plurality of remote monitoring stations 30 are located at corresponding remote terminals and linked through the public switched telephone network to centralized maintenance facility 50. Modem 52 at the facility permits receipt of data messages from stations 30, which messages are printed as received at a printer 54.

The large volume of alarm signal printouts imposes a burden on the maintenance station, as at least one clerk must almost constantly go through all the printout pages and make decisions as to how to deal with the alarms. Further complicating the situation is the fact that every alarm status change in the remote terminal, whether from alarm on to alarm off or vice versa, generates an alarm signal transmission. For example, opening of a door in the remote terminal unit would generating an alarm on status signal and closing the door would generate an alarm off status signal. The clerk must often go through needless perusal of printout data just to determine that alarm on conditions have been cancelled in subsequently received alarm off data messages.

Thus, the need exists for a more efficient way to manage the alarm data received at the centralized station from the various remote terminal monitoring stations prior to the human decision making process. The centralized station should have the capability of readily ordering the received data by source, parameter sensed, and type of alarm condition. It would be highly desirable to have capability to separate out data that is currently of importance for impending corrective disposition from the complete chronological data log that may be retained for historical tracking purposes.

SUMMARY OF THE INVENTION

The present invention fulfills the aforementioned needs. An advantage of the present invention is that a centralized network total system maintenance facility is provided for processing alarm data received from a plurality of remote monitoring stations. The vast amount of incoming data are collected and logged into a file. The data is processed to provide information as to what alarm on status conditions are current.

A further advantage of the present invention is that the data collected in the file are read at predetermined intervals and filtered for the current time interval since the last reading. The filtered data are processed to determine whether alarm on status conditions in effect have changed to off status and whether new alarm on status conditions have occurred.

Yet another advantage of the present invention is that a display is provided in the facility for displaying all current alarm on status conditions. Identification of the location, type of alarm condition for particular sensed parameter, and other information, such as the time the alarm was generated and the priority of the condition, may be displayed. The display can be scrolled for easy identification of items in need of attention.

An additional advantage of the present invention is the provision of a plurality of user work station terminals having individual access to the data base log for display of data in accordance with varied criteria selected by the work station attendant. Updating of the data readout and filtering process can be initiated at any time in response to a work station attendant.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

Figure 3:
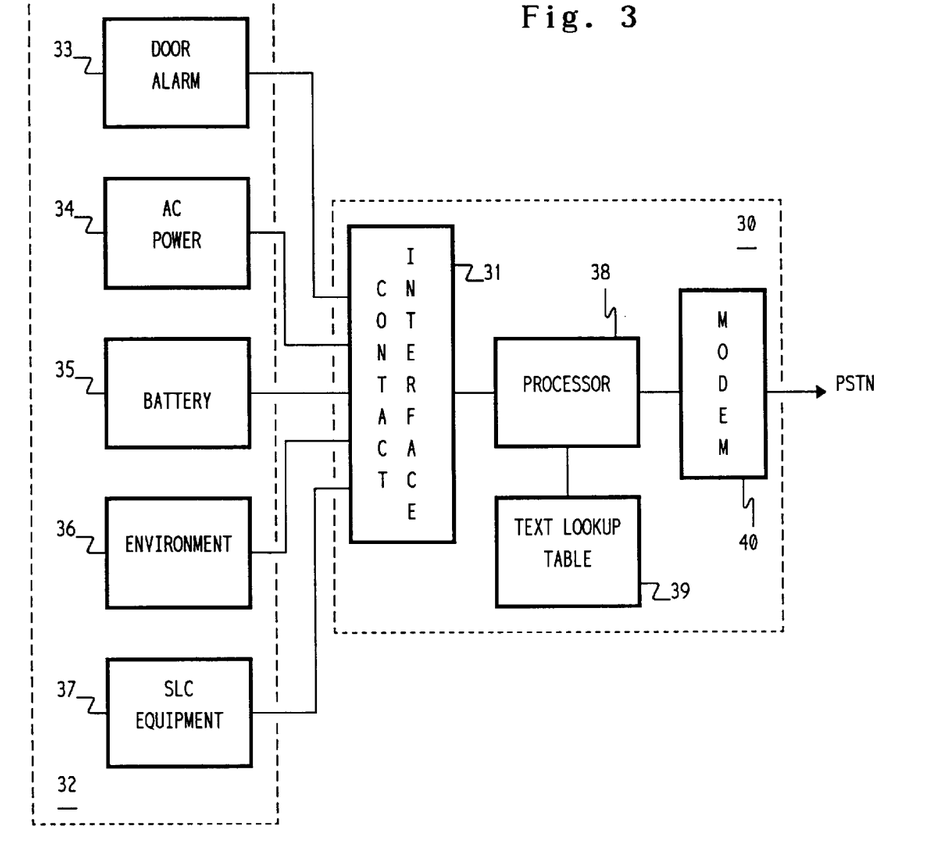
FIG. 3 is a block diagram of a remote monitoring station that communicates with a centralized maintenance facility in accordance with the present invention.

In the block diagram remote monitoring station of FIG. 3, analog sensors 32 are allocated to various conditions for the remote terminal. A contact pair for each sensor is connected in a dc loop to a respective port of contact interface 31 in the monitoring unit 30. Any number of conceivable conditions at the terminal may be considered of sufficient importance for sensing. Various environmental factors can interfere with proper operation of the remote station. Conditions that are cause for concern include unusually high or low temperatures, high humidity, high water accumulation and fire. For purposes of illustration, the sensors shown are door alarm sensor 33, ac power sensor 34, battery sensor 35, environment (for example, temperature) sensor 36, and SLC equipment sensor 37. Sensors used for these condition parameters are well known in the art and detailed description of the specifics thereof are not necessary for an understanding of the present invention.

Each sensor provides an output signal that controls the opening or closing of a contact pair in the dc loop to the monitoring unit interface port. For a sensed normal condition, the contact pair is optionally maintained at either an opened or closed state, indicative of an alarm off status. When an abnormal condition is sensed, the state of the contact pair is changed, indicative of an alarm on status. Each change in state of sensor contacts is input to processor 36, which accesses text lookup table 39 to obtain information corresponding to the port with which the change is associated. The processor then constructs a data message to be transmitted to the centralized maintenance facility through dialup by modem 40. The information stored in the lookup table 38 must be sufficient to identify the sensed parameter and, preferably, provide a basis for ascribing, at the centralized maintenance facility, a priority level to the sensed alarm condition.

Figure 4:
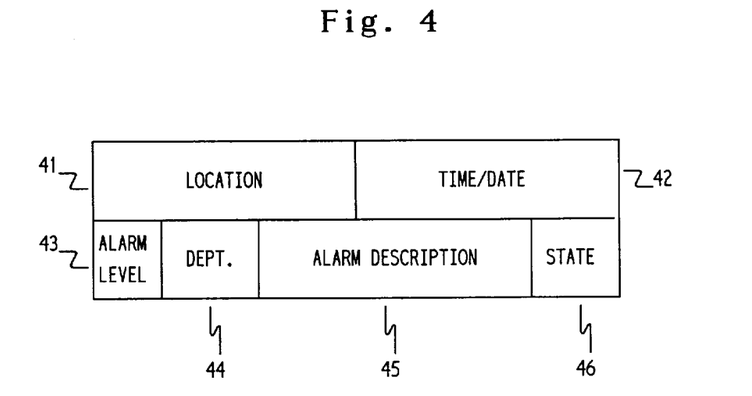
FIG. 4 is a diagram illustrative of message syntax structure used by the remote monitoring station in accordance with the present invention.

The data message is allocated a predetermined number of data bits for message characters arranged in an established syntax. FIG. 4 is a diagram illustrative of a preferred message syntax structure. As illustrated, the message comprises two lines of data. Block 41 in the first line contains a prescribed number of data bits allocated to location information, such as address and telephone number with which the location is associated. Block portion 42 is allocated for a time and date stamp for the alarm message. The second line of the data message is allocated respectively for alarm level at block 43, department at block 44, text description of the sensed condition at block 45, and the state of the alarm, i.e. on/off, at block 46. The alarm level data preferably is indicative of one of at least three levels of concern, e.g.: minor, major and critical.

Figure 5:
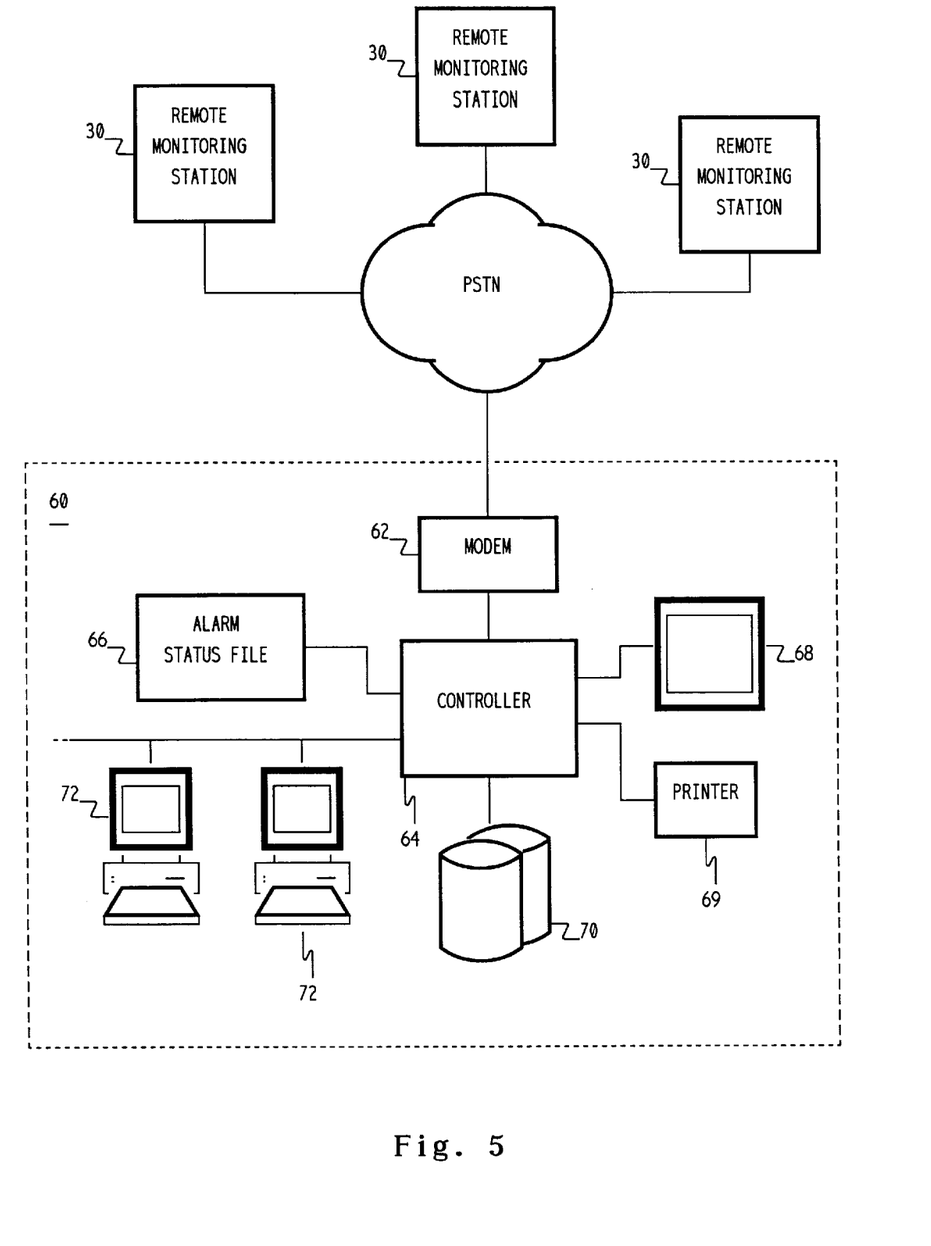
FIG. 5 is a simplified diagram of a network remote terminal monitoring system in accordance with the present invention.

The alarm signal message is transmitted through the public switched telephone network (PSTN) to the network centralized maintenance facility 60 as illustrated in FIG. 5. While only a few remote monitoring stations 30 are shown, it is to be understood that the facility is capable of receiving alarm message data via the PSTN from a large plurality of such remote stations. At the maintenance facility, modem 62 provides the received messages in data form to controller 64. Controller 64 preferably may comprise one or more UNIX processors. As received, the alarm data are stored in an alarm log file (not shown). As the capacity of the log file is approached, the earliest stored chronological data is dropped as new data is received for storage. As discussed in more detail below, processor 64 maintains an alarm status file 66 that contains current alarm information. The controller is also in communication with display 68, printer 69, data base 70 and work stations 72.

Current applicable alarm data are displayed at display 68. Preferably, the controller is programmed to read the alarm status file 66 periodically, for example on an hourly basis, to evaluate the newly received data. Display 68 is then updated to indicate what alarm on conditions are current, their source of origination and type, what time they came in, what date they came, the priority of the alarms, and what department is associated with each alarm. Such information would enable an attendant at the maintenance facility to determine whether it is necessary for immediate contact with the indicated department to handle the alarm. Previously indicated alarm on conditions that have been rectified are deleted from the display and new alarm on conditions that have occurred during the last period are added to the display. While shown diagrammatically as a single device, the display may comprise a plurality of monitors that simultaneously show all current updated alarm data. Alternatively, one or more monitors may have a scrolling capability if there is insufficient screen area for all the data to be displayed. Updated data may be printed at printer 69.

Data base 70 contains information about each remote station in the system and the sensed parameters for which alarm data may be received. Details that may be included are the address of the station, whether there are any unique access needs to get into the remote station, and like information that would be helpful to a person dispatched to the remote location. The data base also provides information related to specific data elements of the messages received to aid evaluation thereof.

A plurality of user workstations 72 are connected to the processor through a local area network. A program menu is provided for selection at a workstation of various functions, including the following. An active alarm list, similar to that displayed at display 68, can be displayed at the workstation monitor. The list fields preferably includes the site location, date and time of the alarm, type of alarm, central office associated with the site location and the alarm. The data can be filtered by field in accordance with the attendant's needs. The work station attendant can force the program to update the alarm list since the last time it was processed. The workstation has the capability of accessing the data base for displaying a list of all remote sites on the system. As an indication of remote station functionality, it is preferable that all remote stations transmit data to the maintenance facility on a regular basis, for example daily, even if no alarm signals are generated during a given time period. Work station 72 can access data for a display of sites that have not transmitted a scheduled report. A summary list also can be accessed and displayed of all reports received for the current day or previous day. The workstation attendant can manually delete a false alarm or alarm that has not been correctly interpreted. These data base functions are provided through the use of filters in the application program performed by controller 64.

Figure 6:
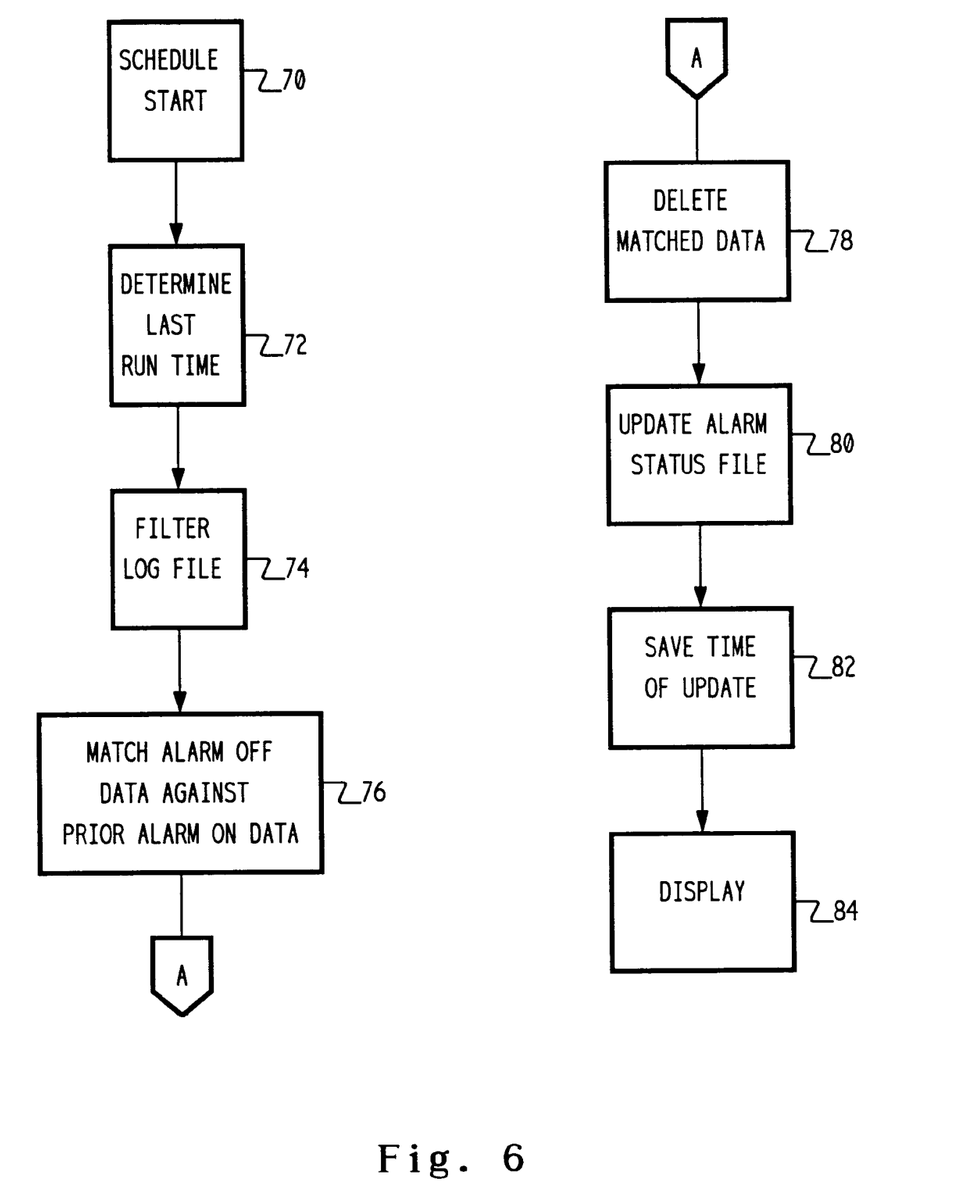
FIG. 6 is a flow chart illustrating alarm updating in accordance with the present invention.

FIG. 6 is a flow chart exemplifying a controller scheduled alarm update operation and is also applicable to a manually forced update operation initiated by a workstation. At the scheduled update time, the controller initiates the update operation at step 70. At step 72, determination is made of the last time that the alarm status file was updated, which may have resulted either from a scheduled or forced operation. At step 74, the chronological alarm log file is retrieved and the data prior to the time determined in step 72 is filtered out, leaving only data that has been received since the last update. From this data, all alarm off status data is matched against prior received alarm on status data for the same location and sensed parameter at step 76. That is, the alarm off status data is matched against the active alarms in the file to be updated as well as the prior alarm on status data received in the interim period. As the alarm off status data cancels the earlier alarm on status data, all the matched data is deleted at step 78. The remaining data should be indicative of the current alarm conditions and the alarm status file is updated therewith at step 80. In the unlikely event that an alarm off status exists for which there is not stored prior alarm on status condition, the display would readily draw attention at the work station for further investigation. The time of the update is saved at step 82 to serve as a reference for the next update operation. At step 84, the new active alarm status is displayed at display 68. Preferably, this operation will provide a summarization of active alarm on sites, by number of critical, major and minor alarm conditions. Also, the number of alarms logged in the last interim period can be displayed. A detailed display of this alarm information can be obtained at the option of the facility attendant. The attendant can extract data from the updated alarm status file in accordance with particular criteria for printing at printer 69, or a locally assigned printer (not shown), for detailed study.

As can be appreciated, the capability for displaying all current data at display 68 and the functionality provided for the workstations eliminates the prior art problems involved in maintenance staff personally watching the million or more lines of data as they are received and printed in the prior art system of FIG. 2.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, the remote monitoring station may be provided with a backup wireless capability for dialing out alarm signal data if the land line connection becomes inoperative. Also, a plurality of centralized maintenance facilities can be located over a large geographical area. Such facilities can share the monitoring and data base functionalities so that work force operation schedules can be made flexible and a safe measure of redundancy is provided.

What is claimed is:

1. A method for monitoring conditions at one or more remote terminals in a telephone network comprising the steps of:

determining parameters to be sensed at said remote terminals;

generating an alarm signal message, at a location proximate one remote terminal at which an alarm condition is sensed, in response to a sensed change in a condition of any of said parameters associated said one remote terminal, said generating step comprising identifying the parameter of the sensed condition and its alarm status, said alarm status being indicative of either an alarm on condition that corresponds to a sensed fault for a respective parameter or an alarm off condition that corresponds to no sensed fault for the respective parameter; and formulating a message comprising information obtained in said identifying step, the date and time of the sensed change in condition, and the alarm level of concern;

communicating said alarm signal message to a centralized maintenance facility;

saving said alarm signal message in a log file at said maintenance facility, said log file containing alarm messages received from said remote terminals in chronological order;

updating an alarm status file at said maintenance facility with recent log file data; and displaying updated data at said maintenance facility; and wherein said alarm status file comprises a listing of alarm signal message data having alarm on status indications and said step of updating comprises:

removing data from said alarm status file that correspond by location and parameter to chronologically subsequent logged alarm signal messages having alarm off status indications; and adding alarm signal message data of recently logged messages having alarm on status indications for which there are no chronologically subsequent corresponding messages having alarm off status indications.

2. A method as recited in claim 1, wherein said updating step is periodically repeated at scheduled intervals and reference is made to logged messages that have occurred since the last prior updating step was performed.

3. A method as recited in claim 1, wherein said updating step is performed by request at the maintenance facility and reference is made to logged messages that have occurred since the last prior updating step was performed.

4. In a public switched telephone network (PSTN) having a plurality of central office facilities serving subscribers through respective subscriber loop connections to terminals at locations remote from said central office facilities, said remote terminals having associated monitoring stations proximate thereto connected to the PSTN for transmitting alarm signal messages indicative of change in alarm status condition for any of a plurality of sensed parameters to a centralized maintenance facility, a method for maintaining an alarm status file at said facility for all said remote monitoring stations, said method comprising the steps of:

saving alarm signal messages received from said remote monitoring stations in a log file in chronological order, said alarm signal messages containing either alarm on or alarm off status indications;

entering alarm signal message data indicative of alarm on condition status for received messages in an alarm status file; and updating said alarm status file with recent log file data, said updating step being repeated at time intervals that do not exceed a predetermined maximum time period, said updating step comprising the steps of:

determining the time of occurrence of a last previous updating step;

filtering data in said log file for data entered since the time determined in said determining step;

from the data obtained in said filtering step, matching alarm signal message data indicative of an alarm off status condition against corresponding alarm signal message data in said alarm status file that is indicative of an alarm on status;

identifying alarm signal message data indicative of an alarm on status in the data obtained in said filtering step for which there is no subsequent corresponding alarm signal message data indicative of an alarm off status;

deleting the data matched in said matching step from said alarm status file;

adding the data identified in said identifying step to said alarm status file; saving the alarm status file as modified in said deleting and adding steps; and saving the time at which the modified alarm status is saved;

whereby only active alarm on message data is saved in the alarm status file.

5. A method as recited in claim 4, wherein said updating step is periodically repeated at scheduled intervals.

6. A method as recited in claim 5, wherein a said updating step is performed at a time other than a scheduled interval time by request at the maintenance facility.

7. A method for monitoring a plurality of predetermined condition parameters at one or more remote terminals in a telephone network comprising the steps of:

sensing an alarm condition, indicative of a change of one of said parameters, at one of said remote terminals;

generating an alarm signal message at said one remote terminal in response to said sensed alarm condition, said signal message comprising the identity of the sensed parameter and its alarm status, the alarm status being indicative of either an alarm-on fault condition or an alarm off-no-fault condition;

upon generating said alarm signal message, automatically communicating said alarm signal message to a centralized maintenance facility;

saving said alarm signal message, chronologically with other received alarm messages, in a log file at said maintenance facility;

updating an alarm status file at said maintenance facility with recent log file data, said updating step comprising removing alarm-on data from said alarm status file that correspond by location and parameter to chronologically subsequent logged alarm-off signal data and adding alarm-on data for which there are no chronologically subsequent corresponding alarm-off data; and displaying updated data at said maintenance facility;

whereby only active alarm-on data is saved in the alarm status file.

* * * * *